United States Patent [19]

Larson

[11] 4,340,126

[45] Jul. 20, 1982

[54] OVERSPEED CONTROL FOR A VEHICLE DRIVE SYSTEM

[75] Inventor: Donald J. Larson, Joliet, Ill.

[73] Assignee: Caterpillar Tractor Co., Peoria, Ill.

[21] Appl. No.: 73,410

[22] PCT Filed: Feb. 8, 1979

[86] PCT No.: PCT/US79/00068

§ 371 Date: Feb. 8, 1979

§ 102(e) Date: Feb. 8, 1979

[87] PCT Pub. No.: WO80/01668

PCT Pub. Date: Aug. 21, 1980

[51] Int. Cl.³ .............................................. B60K 17/10
[52] U.S. Cl. ..................................... 180/305; 180/197
[58] Field of Search ............... 180/197, 308, 307, 305, 180/242, 243; 280/6.1, 707, 111, 6.11, 714

[56] References Cited

U.S. PATENT DOCUMENTS

| | | | |
|---|---|---|---|
| 3,177,964 | 4/1965 | Anderson | 180/307 |
| 3,183,015 | 5/1965 | Al linquant | 280/6.1 |
| 3,656,570 | 4/1972 | Gortnar et al. | 180/308 X |
| 3,666,286 | 5/1972 | Engfer | 280/707 |
| 3,714,999 | 2/1973 | Fletcher | 180/306 X |
| 3,984,978 | 10/1976 | Alderson | 180/306 X |

Primary Examiner—Joseph F. Peters, Jr.
Assistant Examiner—Milton L. Smith
Attorney, Agent, or Firm—Wegner, Stellman, McCord, Wiles & Wood

[57] ABSTRACT

A vehicle drive system including a wheel (16) to be driven, a suspension (18) having multiple relatively movable parts (24,26,28) and mounting the wheel for rotation and translation on a vehicle frame, a hydraulic rotary output motor (12) connected to the wheel for driving the wheel, a hydraulic pump (10) providing hydraulic fluid under pressure to the motor, a conduit (50) interconnecting the pump and the motor, and a flow control valve (40) in the conduit for controlling the flow. A switch (90) is associated with two of the relatively movable parts of the suspension for sensing relative movement therebetween indicative of the wheel losing contact with the underlying terrain and a valve (60) is responsive to the switch (90) for causing the flow control valve (40) to halt the flow of hydraulic fluid between the pump and the motor upon the wheel losing contact with the ground to prevent overspeed of the motor (12).

10 Claims, 2 Drawing Figures

OVERSPEED CONTROL FOR A VEHICLE DRIVE SYSTEM

DESCRIPTION

1. Technical Field

This invention relates to hydraulic wheel drive systems for vehicles, and more particularly, to the prevention of the development of an overspeed condition in such systems.

2. Background Art

Prior art of possible relevance includes U.S. Pat. No. 3,984,978 issued Oct. 12, 1976 to Alderson.

The above identified Alderson patent discloses a vehicle wheel drive system wherein a wheel is driven by a hydraulic motor which in turn is provided with pressurized fluid by a pump. The motor is of the variable displacement type and control over the same is maintained by three valves including a flow control valve, a pressure control valve, and a direction control valve.

While the system works well for its intended purpose, as disclosed by Alderson, certain defects exist. The usual rotary output hydraulic motor typically has a maximum speed rating which cannot be safely exceeded without damaging or destroying the motor. And in a system such as that proposed by Alderson where a variable displacement motor is used, when there is no resistance to rotation of the wheel, the resulting drop in system pressure will tend to cause the pressure control valve therein to stroke back the motor, that is, reduce its displacement. This in turn causes an increase in the rotational output speed of the motor with the consequence that its safe speed limit may be exceeded.

Depending upon the application in which the system is used, the possibility of the lack of application of resistance to the wheel varies. When used in, for example, a motor grader as an auxiliary front wheel drive as proposed by Alderson, the possibility is quite real. It will typically occur when one or the other of the front wheels loses contact with the underlying terrain. This, in turn, can occur with a fair degree of frequency in a motor grader. For example, when the motor grader is being utilized to smooth uneven terrain, the fact that the terrain is uneven may cause one of the wheels to lose contact with it. Alternately, if the motor grader mold board is driven with considerable force into the underlying terrain to achieve the desired bite for grading purposes, it may lift one or the other or both of the front wheels off the ground since weight distribution in a typical motor grader usually results in the center of gravity being located well toward the rear of the vehicle.

To solve this problem, the prior art has utilized flow limiting devices in the flow paths to the motors. The flow limiters preclude sufficient flow to the motors to cause an overspeed condition of the motors to come into existence. However, such flow limiters add appreciably to the cost of the vehicle and because there will typically be a 200 to 250 psi pressure drop across each flow limiter, the size of the prime mover for the hydraulic pump must be increased to attain the same system pressure that would be obtainable at the motors without the flow limiters.

DISCLOSURE OF THE INVENTION

In one aspect of the present invention, there is provided a vehicle drive system including a wheel to be driven, a hydraulic rotary output motor connected to the wheel for driving the wheel, a hydraulic pump for providing hydraulic fluid under pressure to the motor, and a flow control valve for controlling the flow of hydraulic fluid between the motor and the pump. The invention contemplates the improvement wherein means are provided for sensing when the wheel loses contact with the underlying terrain and means responsive to the sensing means for halting the flow of hydraulic fluid between the pump and the motor.

As a consequence, the use of flow limiters is avoided in favor of simple sensing means and the undesirable overspeed condition is prevented from coming into existence whenever the condition that might lead to an undesirable overspeed condition is sensed.

BEST MODE FOR CARRYING OUT THE INVENTION

Figure 1:
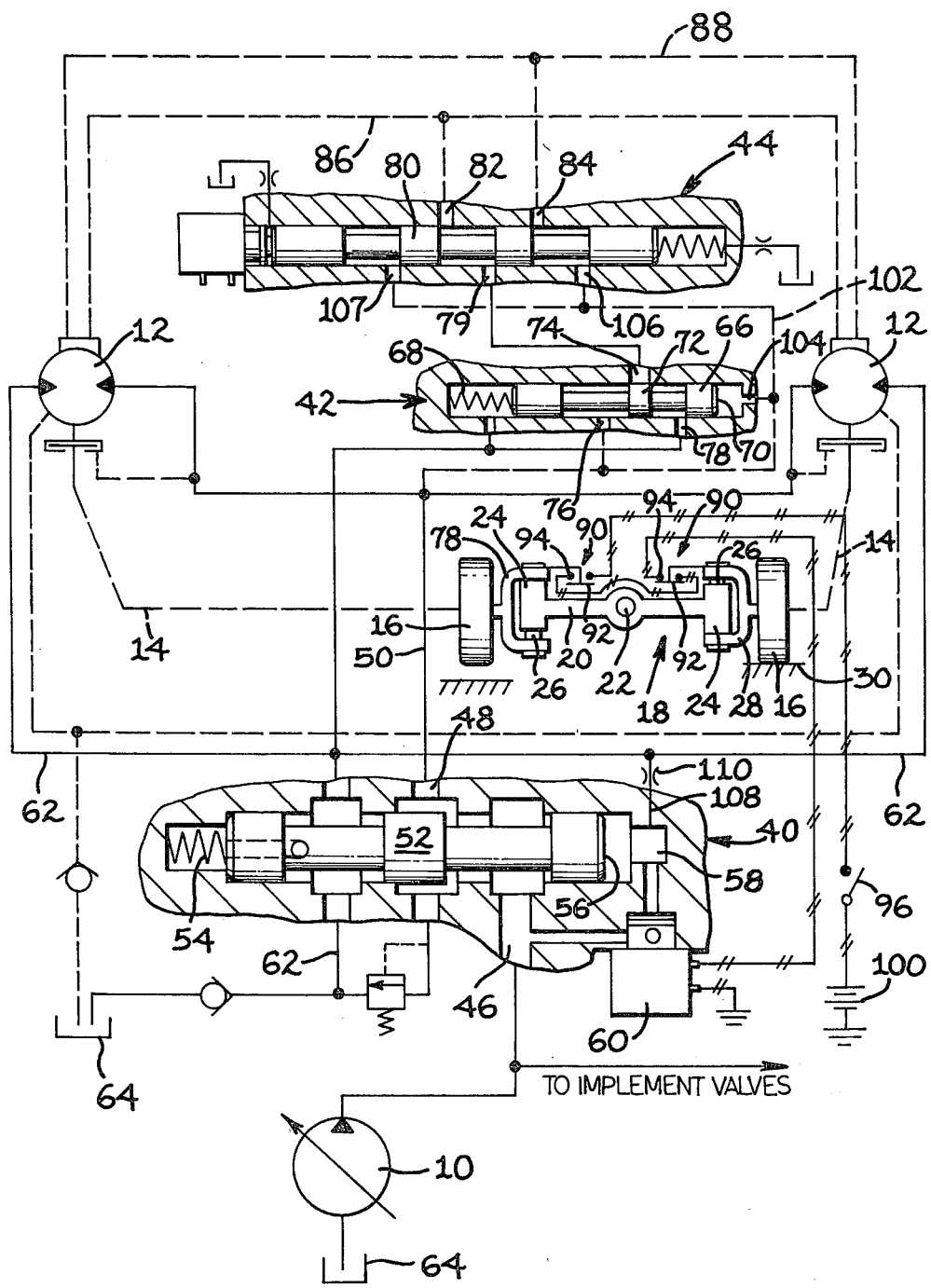
FIG. 1 is a schematic of an embodiment of a vehicle drive system made according to the invention.

An exemplary embodiment of a vehicle drive system made according to the invention is illustrated in FIG. 1 and is seen to include a hydraulic pump 10 for providing hydraulic fluid under pressure to the remainder of the system. Hydraulic motors 12 which preferably are of the variable displacement type, have rotary outputs, and are bidirectional, receive hydraulic fluid under pressure and include mechanical connections shown schematically at 14, to wheels 16. The wheels 16 are mounted on a vehicle frame (not shown) by a suspension, generally designated 18. The suspension 18 is formed of multiple parts and may include a cross member 20 pivoted at 22 to the vehicle frame (not shown). At each end of the cross member 20, there is a vertically oriented sleeve 24 which receives the respective king pin 26. The king pins 26 mount respective yokes 28 to the cross member 20 and the yokes 28 each terminate in respective spindles which in turn journal associated ones of the wheels 16.

As will be appreciated by those skilled in the art, a certain amount of play is present in the interconnection between the yokes 28 and the sleeves 24 by the king pins 26. As shown in FIG. 1, the right-hand wheel 16 is in contact with the underlying terrain 30 with the consequence that the lower end of the yoke 28 for that wheel is in abutment with the underside of the sleeve 24 on the right-hand end of the cross member 20. Conversely, the left-hand wheel 16 is illustrated as being out of contact with the underlying terrain and the components are reversely oriented such that gravity will cause the wheel 16 and associated yoke 28 to descend to their lowermost position within the limits of play.

The showing in FIG. 1 is exaggerated for illustrative purposes. In the usual case, the amount of play will be approximately 0.030 to 0.060 inches.

To direct hydraulic fluid from the pump 10 to the motors 12, there is provided a hydraulic circuit which includes a flow control valve, generally designated 40, a pressure control valve, generally designated 42, and a direction control valve, generally designated 44. The valves 40, 42 and 44 generally function in the same fashion as their counterparts in the previously identified Alderson patent and therefore will be described only to the extent necessary to provide a full understanding of the present invention.

Turning to the flow control valve 40, the same includes an inlet 46 connected to the pump 10 and an outlet 48 connected to a high pressure line 50 which in turn is connected to both of the motors 12. The valve 40 contains a shiftable spool 52 by which fluid communication between the ports 46 and 48 is controlled. A spring 54 biases the spool 52 towards the right as shown in FIG. 1 which is towards a closed position wherein fluid communication between the ports 46 and 48 cannot be had.

To move the spool 52 to the left and towards a position permitting fluid communication between the ports 46 and 48, the right-hand end of the spool 52 is provided with a pressure responsive surface 56. A port 58 facing the surface 56 is connected to the inlet port 46 via a solenoid operated valve 60. When the solenoid operated valve 60 is energized, it will open so as to allow pressurized fluid from the inlet 46 to be directed to the surface 56 to urge the spool 52 to the left, towards an open posiiton, against the bias of the spring 54 which is in bucking relation to the surface 56. Actual flow through the valve 40 is controlled in the usual fashion.

The valve 40 also includes porting for a return line 62 connected to a hydraulic reservoir 64 for the pump 10.

The pressure control valve 42 includes an axially shiftable spool 66 which is biased by a spring 68 toward the right as viewed in FIG. 1 and which has a pressure responsive surface 70 on its right-hand end in bucking relation to the spring 68. The spool 66 includes a land 72 which is operable to modulate the flow of hydraulic fluid between a port 74 and either of two axially spaced ports 76 and 78. The port 76 is connected to the high pressure line 50 while the port 78 is connected to the return line 62. The port 74 is connected to a port 79 in the direction control valve 44 and a spool 80 therein is shiftable to allow fluid communication between the port 79 and either a port 82 or a port 84.

The port 82 is connected to a line 86 while the port 84 is connected to a line 88. The lines 86 and 88 are connected to a swashplate positioning mechanism in each of the variable displacement motors 12 in a conventional fashion. For one direction of rotation of the outputs of the motors 12, a pressure in the line 88 in excess of pressure in the line 86 will result in a movement of the swashplate in the motors 12 to a maximum displacement position.

For a lessening of the pressure differential existing in the two lines 86 and 88, the motors 12 will be "destroked", that is, moved to a minimum displacement position. When equal pressures prevail, the swashplates of both will be in a neutral position. And, of course, the position of the swashplates in each of the motors 12 can be infinitely varied by regulating the actual pressure difference between the two lines 86 and 88.

Sensors for determining whether the wheels 16 are in or out of contact with the underlying terrain are provided in the form of microswitches 90, there being one for each wheel 16. The microswitches 90 are single pole single throw switches and as shown in the drawings, have their blades 92 fixed to corresponding yokes 28 so as to be movable therewith relative to the cross member 20. Contacts 94 of each switch are mounted on the cross member 20 in such a way that each switch will open when the corresponding yoke 20 shifts to a position indicative of the corresponding wheel 16 being out of contact with the underlying terrain.

The two switches 90 are connected in series with each other and with a system switch 96, a battery 100 or other source of power, and the solenoid valve 60. Thus, whenever both wheels 16 are in contact with the ground and their corresponding switches 90 are closed and the switch 96 closed, the solenoid valve 60 will be opened to admit fluid under pressure to the port 58.

The system further includes a pilot line 102 connected to the high pressure line 50 and to a port 104 in the pressure control valve 42 so as to apply the pressure in the high pressure line 50 to the pressure responsive surface 70 of the spool 66. The pilot line 102 also extends to a port 106 in the direction control valve 44. The line 102 also extends to a port 107 in the direction control valve 44. It will be appreciated that shifting of the spool 80 in the valve 44 interconnects the ports 107 and 82, and the ports 79 and 84 to provide one direction of movement of the outputs of the motors 12 or can connect the ports 106 and 84 and the ports 79 and 82 to provide the opposite direction of rotation.

The system is completed by a bleed line 108 interconnecting the port 48 in the flow control valve 40 and the return line 62. A restricted orifice 110 is located in the bleed line 108. Thus, when the solenoid valve 60 closes to prevent fluid under pressure from being directed to the surface 56, any residual fluid under pressure in the port 58 may bleed off at a restricted rate through the bleed line 108.

Figure 2:
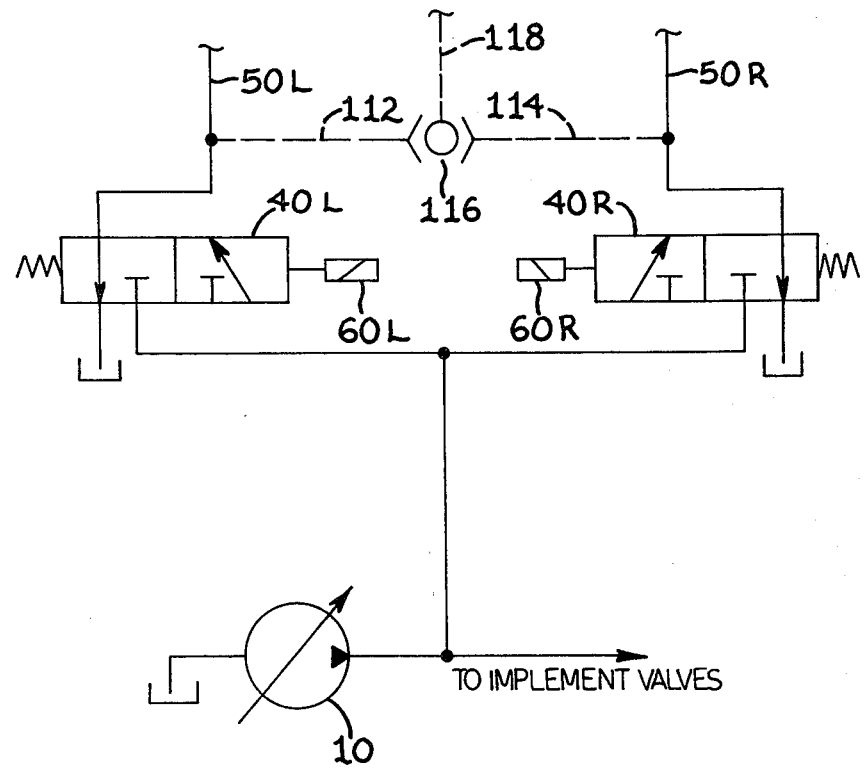
FIG. 2 is a partial schematic of a modified embodiment of the vehicle drive system.

As will be explained hereinafter, the above described system will halt the flow of hydraulic fluid under pressure to both of the motors 12 whenever either of the wheels 16 loses contact with the underlying terrain. In some instances, however, it may be desirable to halt the flow of fluid only to the motor whose associated wheel 16 has left the underlying terrain while continuing flow to a motor whose wheel remains in contact with the underlying terrain. In such a case, the system illustrated, fragmentarily, in FIG. 2 may be employed. In the system shown in FIG. 2, the pump 10 is retained and two of the flow control valves 40 are employed. As shown in FIG. 2, the flow control valve for the left-hand motor 12 is designated 40L while the right-hand valve is designated 40R. They are otherwise identical in construction to the valve 40 shown in FIG. 1 and each includes corresponding solenoid valves 60L and 60R. A high pressure line 50L extends from the valve 40L to the left-hand motor 12 while a second high pressure line 50R extends from the valve 40R to the right-hand motor 12. Pilot lines 112 and 114 extend from the lines 50L and 50R to a resolver 116 which in turn has an output line 118 which is connected to the ports 76 and 104 in the pressure control valve 42 and to the ports 106 and 107 in the direction control valve 44.

A suitable electrical circuit (not shown) connects the switch 90 for the left-hand wheel 16 in series with a source of power and the solenoid valve 60L. A similar circuit connects the switch 90 associated with the right-hand wheel 16 in series with the solenoid valve 60R and a source of power. Off/on switches such as the switch 96 may be provided in both. As will become apparent, should the left-hand wheel 16 come out of contact with the ground, the switch 90 associated therewith will open thus deenergizing the solenoid valve 60L to cause the valve 40L to halt the flow of hydraulic fluid from the pump 10 to the left-hand motor 12. When the right-hand wheel 16 comes out of contact with the ground, similar action will occur with the solenoid valve 60R and the flow control valve 40R.

INDUSTRIAL APPLICABILITY

The vehicle drive system of the present invention may be used advantageously in many applications. Frequently, it may be utilized in connection with auxiliary drive systems such as the auxiliary front wheel drive systems employed in motor graders. The advantages of the present invention over prior art will now be explained in connection with a staatement of the operation thereof.

Assuming the switches 90 and 96 to be closed, the solenoid valve 60 will be open to allow pressurized fluid entering the port 46 from the pump 10 to be applied to the pressure responsive surface 56 and shift the spool 52 to the position illustrated in FIG. 1. Hydraulic fluid under pressure will flow from the output port through the lines 50 to drive the hydraulic motors 12.

Initially, the spool 66 of the pressure control valve 42 will be to the right of the position illustrated and the pressurized fluid in the line 50 will be directed via the pilot line through ports 76 and 74 of the pressure control valve and ports 79 and 82 of the direction control valve 44 to the line 86. The same pressurized fluid will be directed via the pilot line 102 through the ports 106 and 84 to the line 88. Balanced pressure in the lines 86 and 88 will cause the swashplates of the motors 12 to assume a neutral condition.

As system pressure builds up, the application of fluid under pressure to the pressure responsive surface 70 from the pilot line 102 via the port 104 in the pressure control valve 42 will cause the spool 66 to shift to the position illustrated in FIG. 1 thereby modulating the flow of hydraulic fluid at the port 74 and thus in the line 86. However, fluid pressure in the line 88 will not be modulated and as a consequence, the swashplates of both motors 12 will shift to a maximum displacement, or low speed, high torque position. This condition will exist until the motors reach a predetermined speed. At this predetermined speed the motors will be taking all available pump flow. This will, in turn, tend to cause system pressure to drop which in turn will cause the spool 66 to shift slightly to the right in the position illustrated in FIG. 1 to direct a higher pressure to the line 86 thereby tending to shift the swashplates in the motors 12 towards a minimum displacement, high speed position. Steady state conditions are soon reached in any event as is known in the art.

Should one of the wheels 16 lose contact with the underlying terrain, there will be only internal resistance to rotation of its associated hydraulic motor. Consequently, pressure in the line 50 will rapidly drop causing the spool 66 to shift to the right as mentioned immediately preceding and thereby causing the swashplates of the motor to shift to minimum displacement, high speed positions whereat, without resistance to rotation of the wheel 16 that is out of contact with the terrain, the associated motor 12 could overspeed and damage itself.

In the prior art, flow limiting devices in the line 50 are employed to prevent sufficient flow to the motors 12 to generate such an overspeed condition; and such flow limiters are expensive, thereby contributing to the cost of the system. Moreover, it is not untypical to have a 200–250 psi pressure drop across the flow limiters with the result that the full pressure available at the port 48 is not available to the motors 12 thereby requiring an increase in the pressure at the port 48 if the motors 12 are to receive a desired minimum pressure. This requires a bigger prime mover for the pump 10, which also adds to the expense of the system.

However, in the system of the present invention, when the wheel 16 leaves the ground, it opens its associated switch 90 thereby halting the flow of electrical energy to the solenoid valve 60 causing the same to close. As a consequence, the bias of the spring 54 will shift the spool 52 to the right from the position shown in FIG. 1 halting the flow of fluid between the ports 46 and 48 thereby halting the flow of fluid to the motors 12 and preventing the possibility of an overspeed condition coming into existence.

Because it is possible, when the vehicle is traveling over abrupt terrain, that one or the other of the switches 90 may open momentarily and for a sufficiently short period of time that an overspeed condition cannot come into existence, it is desirable in terms of providing steady operation that such indications be disregarded. This is provided by the presence of the bleed line 108. For even though the solenoid valve 60 closes to shut off the flow of pressure fluid to the surface 56, residual fluid under pressure in the port 58 will tend to hold the spool 52 in an open position against the bias of the spring 54. Such action will occur until the fluid in the port 58 is sufficiently bled down through the bleed line 108, the rate of such flow being controlled by the size of the orifice 110.

Thus, the bleed line 108 acts as a time delay means whereby spurious signals indicative of a wheel leaving the ground are disregarded.

The embodiment illustrated in FIG. 2 works similarly insofar as the halting of fluid flow is concerned except, of course, only the flow control valve 40L or 40R associated with the wheel 16 that has left the ground is closed to half fluid flow.

In order to provide proper operation of the pressure control valve 42, the resolver 116 directs the highest pressure signal in either the line 50L or the line 50R to the pressure control valve 42 at the ports 76 and 104 as well as to the lines 86 and 88 via the portions 107 and 106, the latter dependent upon the position of the spool 80 of the direction control valve 44.

It will therefore be appreciated that through the use of inexpensive components such as the switches 90, coupled in control relation with the main flow control valve 40 or 40L and 40R, overspeed conditions are positively avoided without the expense of flow limiting devices and without the undesirable pressure drop effected by the use of such devices.

I claim:

1. In a vehicle drive system including a wheel (16) to be driven, a suspension (18) having multiple relatively movable parts (20,24,26,28) and mounting the wheel for rotation and translation on a vehicle frame, a hydraulic rotary output motor (12) connected to the wheel for driving the wheel, a hydraulic pump (10) for providing hydraulic fluid under pressure to the motor, a conduit (50,50L, 50R) interconnecting the pump and the motor, and a flow control valve (40,40L,40R) in the conduit for controlling the flow of hydraulic fluid between the pump and motor, the improvement comprising:

sensing means (90,92,94) associated with two of the relatively movable parts of the suspension for sensing relative movement therebetween indicative of the wheel losing contact with the underlying terrain on which it is adapted to ride; and valve operating means (54,60,60L,60R) responsive to said sensing means for substantially immediately closing said valve and thereby halt the flow of hydraulic fluid between said pump and motor upon the wheel losing said contact to prevent overspeed of said motor.

2. In a vehicle drive system including a wheel (16) to be driven, a suspension (18) having multiple relatively movable parts (20,24,26,28) and mounting the wheel for rotation and translation on a vehicle frame, a hydraulic rotary output motor (12) connected to the wheel for driving the wheel, a hydraulic pump (10) for providing hydraulic fluid under pressure to the motor, a conduit (50,50L,50R) interconnecting the pump and the motor and a flow control valve (40,40L,40R) in the conduit for controlling the flow of hydraulic fluid between the pump and motor, the improvement comprising:
 means (90,92,94) associated with two of the relatively movable parts of the suspension for sensing relative movement therebetween indicative of the wheel losing contact with the underlying terrain on which it is adapted to ride; and
 valve operating means (54,60,60L,60R) responsive to said sensing means for halting the flow of hydraulic fluid between said pump and motor upon the wheel losing said contact to prevent overspeed of said motor, said sensing means comprising switch means (90,92,94) interconnecting said relatively movable parts and connected to said valve operating means.

3. The vehicle drive system of claim 2 wherein said switch means comprises an electrical switch connected to said valve operating means.

4. In a vehicle drive system including a wheel (16) to be driven, a suspension (18) having multiple relatively movable parts (20, 24, 26, 28) and mounting the wheel for rotation and translation on a vehicle frame, a hydraulic rotary output motor (12) connected to the wheel for driving the wheel, a hydraulic pump (10) for providing hydraulic fluid under pressure to the motor, a conduit (50, 50L, 50R) interconnecting the pump and the motor and a flow control valve (40, 40L, 40R) in the conduit for controlling the flow of hydraulic fluid between the pump and motor, the improvement comprising means (90, 92, 94) associated with two of the relatively movable parts of the suspension for sensing relative movement therebetween indicative of the wheel losing contact with the underlying terrain on which it is adapted to ride, and means (40, 54, 60, 60L, 60R) responsive to said sensing means for halting the flow of hydraulic fluid between said pump and motor upon the wheel losing said contact to prevent overspeed of said motor; and time delay means (58, 108, 110) connected to said halting means for temporarily preventing operation of said halting means so that spurious changes in the relative position of said relatively movable parts are disregarded.

5. In a vehicle drive system including a wheel (16) to be driven, a suspension (18) having multiple relatively movable parts (20, 24, 26, 28) and mounting the wheel for rotation and translation on a vehicle frame, a hydraulic rotary output motor (12) connected to the wheel for driving the wheel, a hydraulic pump (10) for providing hydraulic fluid under pressure to the motor, a conduit (50, 50L, 50R) interconnecting the pump and the motor and a flow control valve (40, 40L, 40R) in the conduit for controlling the flow of hydraulic fluid between the pump and motor, the improvement comprising means (90, 92, 94) associated with two of the relatively movable parts of the suspension for sensing relative movement therebetween indicative of the wheel losing contact with the underlying terrain on which it is adapted to ride, and means (40, 54, 50, 60L, 60R) responsive to said sensing means for halting the flow of hydraulic fluid between said pump and motor upon the wheel losing said contact to prevent overspeed of said motor; said halting means comprising means (54) for closing said flow control valve.

6. In a vehicle drive system including a wheel (16) to be driven, a hydraulic rotary output motor, (12) connected to the wheel for driving the same, a hydraulic pump (10) for providing hydraulic fluid under pressure to the motor and a flow control valve (40,40L,40R) for controlling the flow of hydraulic fluid to the motor from the pump, the improvement comprising:
 means (90,92,94) for sensing when the wheel loses contact with the underlying terrain and providing a signal indicating the same;
 means (54,60,60L,60R) responsive to said signal for closing said flow control valve when the wheel loses contact with the ground; and
 means (108,110) for disregarding spurious signals that may be provided by said sensing means.

7. The vehicle drive system of claim 6 wherein said flow control valve includes a pressure responsive surface (56); a conduit (58) for directing fluid under pressure to said surface to open said flow control valve, said flow control valve further including means (54) in bucking relation to said surface for urging said flow control valve to close the same; said closing means comprising means (60) for closing said conduit to prevent fluid from being applied to said surface; and said disregarding means comprising a restricted bleed (108,110) in fluid communication with said surface.

8. In a vehicle drive system including a pair of wheels (16) to be driven, a suspension (18) having multiple relatively movable parts (20,24,26,28) and mounting the wheels for independent rotation and translation on a vehicle frame, a pair of rotary output, variable displacement hydraulic motors (12) one for each wheel, for driving the associated wheel, a hydraulic pump (10) for providing hydraulic fluid under pressure to the motors, and at least one flow control valve (40,40L,40R) for controlling the flow of fluid from the pump to the motors, the improvement comprising:
 a pair of means (90,92,94) one for each wheel, associated with two of the relatively movable parts of the suspension for sensing relative movement therebetween indicative of the corresponding wheel losing contact with the underlying terrain; and
 valve operating means responsive to said sensing means (60,60L,60R) for substantially immediately closing at least one flow control valve and thereby halt the flow of hydraulic fluid to at least the motor driving the wheel losing such contact when such contact is lost to prevent overspeed of said motor.

9. The vehicle drive system of claim 8 wherein said flow halting means halts flow to both said motors when one or both wheels lose such contact.

10. The vehicle drive system of claim 8 wherein said flow halting means halts flow only to the motor driving the wheel losing such contact.

* * * * *